US012756206B2

(12) United States Patent
Nordholm et al.

(10) Patent No.: US 12,756,206 B2
(45) Date of Patent: Oct. 6, 2026

(54) METHOD FOR OPERATING A SWITCHING ARRANGEMENT

(71) Applicant: VOLVO TRUCK CORPORATION, Gothenburg (SE)

(72) Inventors: Linus Nordholm, Gothenburg (SE); Tobias Smidebrant, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 819 days.

(21) Appl. No.: 17/934,297

(22) Filed: Sep. 22, 2022

(65) Prior Publication Data

US 2023/0097052 A1 Mar. 30, 2023

(30) Foreign Application Priority Data

Sep. 29, 2021 (EP) .................................... 21199804

(51) Int. Cl.
*H02J 7/56* (2026.01)
*H01M 10/42* (2006.01)
(Continued)

(52) U.S. Cl.
CPC ............. *H02J 7/56* (2026.01); *H01M 10/425* (2013.01); *H01M 10/441* (2013.01);
(Continued)

(58) Field of Classification Search
CPC ...... H02J 1/10; H02J 1/106; H02J 7/00; H02J 7/00045; H02J 7/00047; H02J 7/0013;
(Continued)

(56) References Cited

U.S. PATENT DOCUMENTS

| | | | | |
|---|---|---|---|---|
| 11,476,681 B2 * | 10/2022 | Hong | .................. | H01M 10/425 |
| 11,705,741 B2 * | 7/2023 | Trippel | ..................... | H02J 7/40 320/112 |

(Continued)

FOREIGN PATENT DOCUMENTS

| | | | | |
|---|---|---|---|---|
| CN | 102208820 A | * 10/2011 | .......... | H01M 10/441 |
| CN | 111937269 A | * 11/2020 | ............ | H01M 10/48 |
| CN | 112636415 A | 4/2021 | | |

OTHER PUBLICATIONS

Extended European Search Report in corresponding European Application No. 21199804.2 dated Mar. 25, 2022 (6 pages).

(Continued)

*Primary Examiner* — Rexford N Barnie
(74) *Attorney, Agent, or Firm* — Jeffri A. Kaminski; Venable LLP

(57) ABSTRACT

A method for operating a switching arrangement of a rechargeable energy storage system, RESS. The RESS includes parallelly arranged battery packs and the switching arrangement comprising an associated contactor for each battery pack. The contactors are configured to connect and disconnect the battery packs relative a traction voltage bus by closing and opening, respectively, the traction voltage bus being connected to at least one load. The method includes providing a window of opportunity in which no request for powering the load by the battery packs, and no request for charging the battery packs, are allowed to be implemented, in the window of opportunity, preventing the contactors to open enabling equalization due to current transfer between the battery packs, measuring the current transfer between the battery packs, and in response to the measured current transfer, preventing the contactors to open and/or opening the contactors.

14 Claims, 4 Drawing Sheets

(51) Int. Cl.
*H01M 10/44* (2006.01)
*H02J 7/94* (2026.01)

(52) U.S. Cl.
CPC ..... *H02J 7/947* (2026.01); *H01M 2010/4271* (2013.01); *H01M 2220/20* (2013.01)

(58) Field of Classification Search
CPC .......... H02J 7/0024; H02J 7/0032; H02J 7/34; H02J 7/342
USPC ........ 307/9.1, 10.1; 320/137, 138, 149, 161, 320/126
See application file for complete search history.

(56) References Cited

U.S. PATENT DOCUMENTS

2008/0072859 A1 3/2008 Esaka et al.
2008/0272736 A1* 11/2008 Tien .................... H02J 7/00302 320/132
2011/0074354 A1* 3/2011 Yano ................... H01M 10/482 180/65.29
2012/0268070 A1 10/2012 Park et al.
2013/0335026 A1* 12/2013 Reynolds .................. H02J 7/54 320/112
2014/0009106 A1* 1/2014 Andrea .................. H02H 9/002 320/126
2018/0219387 A1* 8/2018 Ishikawa ................... H02J 7/52
2020/0223422 A1 7/2020 Ye et al.
2022/0320873 A1* 10/2022 Li ............................. H02J 1/10

OTHER PUBLICATIONS

Chinese Office Action dated May 20, 2026 in corresponding Chinese Patent Application No. 202211150169.6, 17 pages.

* cited by examiner

METHOD FOR OPERATING A SWITCHING ARRANGEMENT

TECHNICAL FIELD

The present invention relates to a method for operating a switching arrangement of a rechargeable energy storage system. The invention further relates to a switching arrangement for a rechargeable energy storage system, a rechargeable energy storage system, a vehicle, a controlling apparatus for operating a switching arrangement of a rechargeable energy storage system, to a computer program and to a computer readable medium. Although the invention will be described with respect to a truck, the invention is not restricted to this particular vehicle, but may be used in other vehicles or vessels, such as in boats, ships, busses, light-weight trucks, passenger cars, working machines and construction equipment.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage device is used to store the energy needed in order to propel the vehicle. Energy storage devices may further be used to power auxiliary loads in the vehicle.

For many vehicles, the energy storage devices are comprised in an energy storage system, wherein the energy storage system is configured to power the electric machine for propelling the vehicle, as well as any auxiliary load. For example, for an electric vehicle, the energy storage devices may be batteries, which are configured to operate the electric machine as well as electrically driven auxiliary equipment. The electric machine and/or the electrically driven auxiliary equipment may be commonly referred to as a load. Several batteries, or several series-connected and/or parallel connected battery cells, may be grouped into a battery pack. A plurality of battery packs may be grouped into an energy storage system, ESS. The battery pack is periodically in need of external charging, and is then electrically connected to an electrical energy source, e.g. via plug directly connected to the power grid.

In many applications, several battery packs are configured to power the load by being parallelly connected to a traction voltage bus (or traction power bus), wherein the traction voltage bus is in electrical connection with the load. Hereby, the supplied power can be adapted based on the number of battery packs, and/or higher power requirements of the vehicle may be met. Typically, every battery pack is associated with a switch, or contactor, enabling connection and disconnection of each battery pack relative the traction voltage bus and the load. Thus, when a contactor is closed, the associated battery pack is connected to the traction voltage bus to power the load, and when a contactor is opened, the associated battery pack is disconnected from the traction voltage bus and does no longer power the load. However, every time the state of a contactor is changed from closed to open, or vice versa, the contactor is subject to mechanical and electrical wear.

Contactor wear as described above may lead to contactor failure. In particular, premature contactor failure of a single contactor is undesirable, as sometimes more than the failing contactor have to be replaced, which may be very expensive.

SUMMARY

It is an object of the present invention to at least to some extent alleviate the shortcomings discussed above in relation to known energy storage systems and battery packs, and to improve the operation of connecting and disconnecting the battery packs relative a load.

According to at least a first aspect of the present invention, a method for operating a switching arrangement of a rechargeable energy storage system, RESS, the RESS comprising a plurality of parallelly arranged battery packs and the switching arrangement comprising an associated contactor for each battery pack, the contactors being configured to connect and disconnect the battery packs relative a traction voltage bus by closing and opening, respectively, the traction voltage bus being connected to at least one load, is provided. The method comprises:

- providing a window of opportunity in which no request for powering the load by the battery packs, and no request for charging the battery packs, are allowed to be implemented,
- in the window of opportunity, preventing the contactors to open enabling equalization due to current transfer between the battery packs,
- measuring the current transfer between the battery packs, and in response to the measured current transfer, preventing the contactors to open and/or opening the contactors.

Hereby, the voltage difference between the battery packs is reduced, or even minimized, owing to the equalization, which results in an improved condition upon reconnection of the contactors. Thus, electric wear of the contactors is reduced. Hereby, the total life-length of the RESS, or at least the of the switching arrangement and the contactors, may be increased as the electric contactor wear, at least an increased disconnection wear of the contactors, is reduced. Thus, excessive electric wear of a single contactor, e.g. leading to contactor failure, may be avoided. Moreover, the start-up time of the RESS is improved owing to the equalization and the improved condition upon reconnection of the contactors. Moreover, by the equalization of the battery packs, reconnection of the contactors may be performed in a quicker and more reliable manner. For example, in a scenario in which one of the battery pack has a different voltage compared to the others (e.g. due that the battery pack is new), and thus has not been subject to the equalization, an uneven powering situation may occur in which only said battery pack is initially used upon the reconnection of the contactors. This may lead to excessive wear, and slower overall performance (e.g. slower pre-charging).

It should be understood that the equalization due to current transfer between the battery packs implies that the voltage levels between the battery packs are equalized. In other words, the current transfer between the battery packs results in equalization of the battery packs with respect to the voltage levels of the battery packs. As current transfer occurs between the battery packs during the equalization, also current transfer between the battery cells within each battery pack is occurring during the equalization. Described differently, as the contactors are prevented from opening in the window of opportunity (i.e. the contactors are closed), current transfer will automatically occur between the battery packs, via e.g. a traction voltage bus of the associated voltage system (e.g. high voltage system), thereby performing equalization of the battery packs. Thus, the window of opportunity is referring to a vehicle state or a point in time (or a time slot or a time range), in which no request for powering the load by the battery packs, and no request for charging the battery packs, is allowed to be implemented. The traction voltage bus may be referred to as a traction power bus.

According to at least one example embodiment, each battery pack comprises a plurality of battery cells connected in series. Thus, the parallelly arranged battery packs comprises a plurality of parallelly arranged series-connected battery cells. In other words, the equalization occurs due to current transfer between the parallelly arranged series-connected battery cells, or parallelly arranged battery packs.

According to at least one example embodiment, measuring the current transfer between the battery packs comprises a preceding measuring of the current transfer prior to preventing the contactors to open, wherein the method further comprises:

determining whether or not the current transfer in the preceding measurement achieves an initiating threshold, and in response of determining that the current transfer achieves the initiating threshold, preventing the contactors to open.

That is, if the current transfer between the battery packs achieves the initiating threshold, the contactors are prevented from opening.

The initiating threshold may be directly related to the current measurement. Thus, the method may comprise determining whether or not the current transfer in the preceding measurement exceeds the initiating threshold, and in response of determining that the current transfer exceeds the initiating threshold, preventing the contactors to open. For example, the initiating threshold is between 3-5 A, e.g. 4 A, and a current measurement indicating a current transfer between the battery packs above 4 A results in prevention of the contactors to open.

According to at least one example embodiment, the preceding measuring of the current transfer is referred to as a first measuring of the current transfer, or a first measurement of the current transfer. Such first measuring of the current transfer is performed prior to preventing the contactors to open.

According to at least one example embodiment, measuring the current transfer between the battery packs comprises a subsequent measuring of the current transfer after preventing the contactors to open, and wherein the method further comprises:

determining whether or not the current transfer in the subsequent measurement achieves a terminating threshold, and in response of determining that the current transfer achieves the terminating threshold, opening the contactors.

That is, if the current transfer between the battery packs achieves the terminating threshold, the contactors are opened.

The terminating threshold may be directly related to the current measurement. Thus, the method may comprise determining whether or not the current transfer in the subsequent measurement is below the terminating threshold, and in response of determining that the current transfer is below the terminating threshold, opening the contactors. For example, the terminating threshold is 1-2 A, e.g. 1.5 A, and a current measurement indicating a current transfer between the battery packs below 1.5 A results in opening the contactors.

According to at least one example embodiment, the subsequent measuring of the current transfer is referred to as a second measuring of the current transfer, or a second measurement of the current transfer. Such second measuring of the current transfer is performed subsequent of preventing the contactors to open. Thus, such second measuring of the current transfer may be performed subsequent of the first measuring of the current transfer.

According to at least one example embodiment, during preventing the contactors to open, the current transfer between the battery packs is accomplished by the traction voltage bus.

That is, as the contactors are closed, the battery packs are electrically connected to each other via the traction voltage bus. Stated differently, the equalization of the battery packs is accomplished by current transfer between the battery packs via the traction voltage bus.

According to at least one example embodiment, the method comprises disconnecting the battery packs from the traction voltage bus by means of the contactors such that the battery packs are disconnected with a delay enabling current transfer between the battery packs such that the battery packs are equalized. Thus, by controlling the delay of disconnection of the battery packs relative to the traction voltage bus, the electrical wear of the contactors may be reduced during subsequent connections of the battery packs to the traction voltage bus, owing to the improved equalization of the battery packs. The delay of the disconnection of the battery packs from the traction voltage bus may comprise preventing hibernation of the battery system.

According to at least one example embodiment, the battery packs are equalized with regards to the open circuit voltage, OCV.

Thus, after the equalization, the battery packs will have a more equalized OCV. Stated differently, after the equalization, the battery packs will have a more equal OCV. According to at least one example embodiment, the battery packs are equalized to have the same, or substantially the same, OCV. Stated differently, during operation of the battery system as the connectors are kept closed, and at the beginning of the window of opportunity, there are typically differences in the OCV between the battery packs (due to e.g. different aging, different cell chemistries etc.) During the equalization, the current transfer between the battery packs results in a more equalized OCV.

According to at least one example embodiment, the window of opportunity in which no request for powering the load by the battery packs, and no request for charging the battery packs, is allowed to be implemented corresponds to that no request for powering the load by the battery packs, and no request for charging the battery packs, is present. Thus, either are a request for powering the load by the battery packs, and a request for charging the battery packs, not present, or are a request for powering the load by the battery packs, and a request for charging the battery packs not allowed to be implemented, e.g. due to that equalization of the battery packs is prioritized. When referring to a request for charging, the charging may according to at least one example embodiment refer to external charging, e.g. via plug directly connected to the power grid. Thus, throughout the text, charging may refer to external charging.

According to at least one example embodiment, the window of opportunity is shut upon a request for powering the load by the battery packs, or upon a request for charging the battery packs.

That is, the equalization of the battery packs is interrupted or terminated, as the window of opportunity is shut.

According to at least one example embodiment, the request for powering the load or the request for charging is a permitted request from an approved source.

Thus, only approved sources may shut the window of opportunity. Hereby, unnecessary, or unauthorized, termination or interruption of the equalization of the battery packs is avoided.

According to at least one example embodiment, the plurality of battery packs comprises at least three battery packs, and wherein the preventing the contactors to open enabling equalization of the battery packs is carried out for at least two of the battery packs of the plurality of battery packs.

Thus, at least one of the battery packs may be disconnected from the traction voltage bus by opening the corresponding contactor, while the corresponding contactors for the other two battery packs are prevented from opening to achieve the equalization thereof. Stated differently, at least one of the battery packs is prevented from taking part in the equalization. Such battery pack may e.g. have an OCV very different from the other ones, e.g. due to that the battery pack is worn out, or damaged, or that it is a completely new battery pack.

Alternatively, the battery system is configured such that the window of opportunity may be applied to only some of the battery packs in the battery system, while another, or at least two other, battery pack(s) is/are not in the window of opportunity. That is, one battery pack may continue powering or (external) charging (or be available for a request for powering the load or a request for charging), while the other battery pack(s) is/are subject to equalization.

According to at least one example embodiment, the method further comprises:

powering the at least one load by connecting the battery packs to the traction voltage bus by closing the contactors, alternately connecting and disconnecting the battery packs, wherein the step of preventing the contactors to open is carried out prior to each step of disconnecting the battery packs.

Thus, the step of measuring the current transfer between the battery packs, and in response to the measured current transfer, preventing the contactors to open and/or opening the contactors may be carried out prior to each step of disconnecting the battery packs. According to at least one example embodiment, the term disconnecting may be referred to as electrically disconnecting, and the term connecting may be referred to as electrically connecting.

As the battery packs of the energy storage system are parallelly arranged, the contactors of the switching arrangement may be referred to as being parallelly arranged. That is, at least the contactors used for disconnecting the battery packs from the load, or the traction voltage bus, may be referred to as being parallelly arranged. According to at least one example embodiment, the plurality of parallelly arranged battery packs is at least two, or at least three parallelly arranged battery packs. Thus, the switching arrangement comprises a plurality of parallelly arranged contactors, wherein each contactor is capable of connecting and disconnecting an associated battery pack. Correspondingly, the plurality of parallelly arranged contactor is at least two, or at least tree parallelly arranged contactors. It should be understood that the contactors which are configured to connect and disconnect the battery packs relative the load via the traction voltage bus by closing and opening, respectively, may be referred to as main contactors. Typically, when referring to connecting the battery packs by means of the contactors, the associated contactor for each battery pack is closed in order for the battery packs to power the load via the traction voltage bus. Correspondingly, when opening the associated contactor for each battery pack, powering of the load is terminated.

According to a second aspect of the present invention, a switching arrangement for a rechargeable energy storage system, RESS, the RESS comprising a plurality of parallelly arranged battery packs, is provided. The switching arrangement comprises:

an associated contactor for each battery pack, the contactors being configured to connect and disconnect the battery packs relative a traction voltage bus by closing and opening, respectively, the traction voltage bus being connected to at least one load, the switching arrangement being configured to:

recognize a window of opportunity in which no request for powering the load by the battery packs, and no request for charging the battery packs, is allowed to be implemented, in the window of opportunity, prevent the contactors to open enabling equalization due to current transfer between the battery packs, measure the current transfer between the battery packs, and in response to the measured current transfer, prevent the contactors to open and/or opening the contactors.

Effects and features of the second aspect of the invention are largely analogous to those described above in connection with the first aspect of the invention. Embodiments mentioned in relation to the first aspect of the invention are largely compatible with the second aspect of the invention.

According to a third aspect of the present invention, a rechargeable energy storage system, RESS, of a vehicle, the RESS comprising a plurality of parallelly arranged battery packs for powering at least one load, and a switching arrangement according to the second aspect of the present invention is provided.

According to a fourth aspect of the present invention, a vehicle comprising a rechargeable energy storage system, RESS, according to the third aspect of the present invention, or a switching arrangement according to the second aspect of the present invention, is provided.

According to a fifth aspect of the present invention, a controlling apparatus for operating a switching arrangement of a rechargeable energy storage system, RESS, the RESS comprising a plurality of parallelly arranged battery packs and the switching arrangement comprising an associated contactor for each battery pack, the contactors being configured to connect and disconnect the battery packs relative a traction voltage bus by closing and opening, respectively, the traction voltage bus being connected to at least one load, is provided. The controlling apparatus is configured to:

provide a window of opportunity in which no request for powering the load by the battery packs, and no request for charging the battery packs, are allowed to be implemented, in the window of opportunity, prevent the contactors to open enabling equalization due to current transfer between the battery packs, measure the current transfer between the battery packs, and in response to the measured current transfer, preventing the contactors to open and/or opening the contactors.

The controlling apparatus may e.g. be a control unit, such as an ECU, of the vehicle.

According to a sixth aspect of the present invention, a computer program comprising program code means for performing the method according to the first aspect of the present invention, when the program is run on a computer, is provided.

According to a seventh aspect of the present invention, a computer readable medium carrying a computer program comprising program code means for performing the method according to the first aspect of the present invention, when the program is run on a computer, is provided.

Effects and features of the third to seventh aspects of the invention are largely analogous to those described above in connection with the first aspect of the invention. Embodiments mentioned in relation to the first aspect of the invention are largely compatible with the third to seventh aspects of the invention.

Further advantages and features of the present invention are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
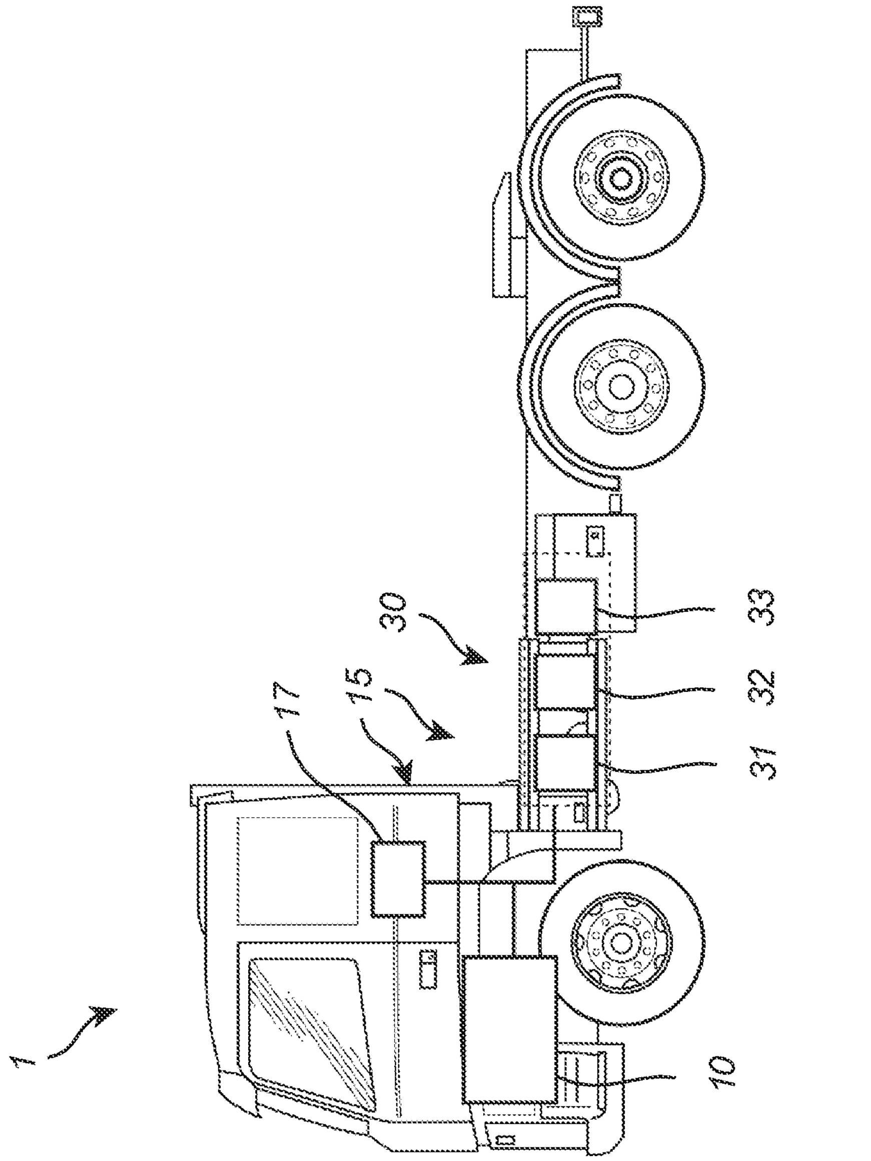
FIG. 1 is a schematic side view of a vehicle comprising a switching arrangement and a rechargeable energy storage system in accordance with an example embodiment of the invention.

With reference to FIG. 1, a vehicle 1, here embodied as a heavy duty truck 1, is disclosed for which a method, switching arrangement 15, and/or rechargeable energy storage system 30 of a kind disclosed in the present invention is advantageous. However, the method, the switching arrangement 15 or rechargeable energy storage system 30 may as well be implemented in other types of vehicles, such as in boats, ships, busses, light-weight trucks, passenger cars, working machines and construction equipment. The vehicle 1 is an electric vehicle, such as a full electric vehicle or a hybrid, comprising at least one electric machine 10 powered by a rechargeable energy storage system, RESS 30, wherein in the example of FIG. 1, the RESS comprises three energy storage devices 31, 32, 33, or battery packs 31, 32, 33. The switching arrangement 15 is configured to connected and disconnect the battery packs 31, 32, 33 relative the electric machine 10. Moreover, the switching arrangement 15 comprises a control unit 17 arranged and configured for controlling the operation of the switching arrangement 15. The vehicle 1 typically further comprises other parts of the powertrain such as transmission, drive shafts and wheels (not shown in detail).

Figure 2:
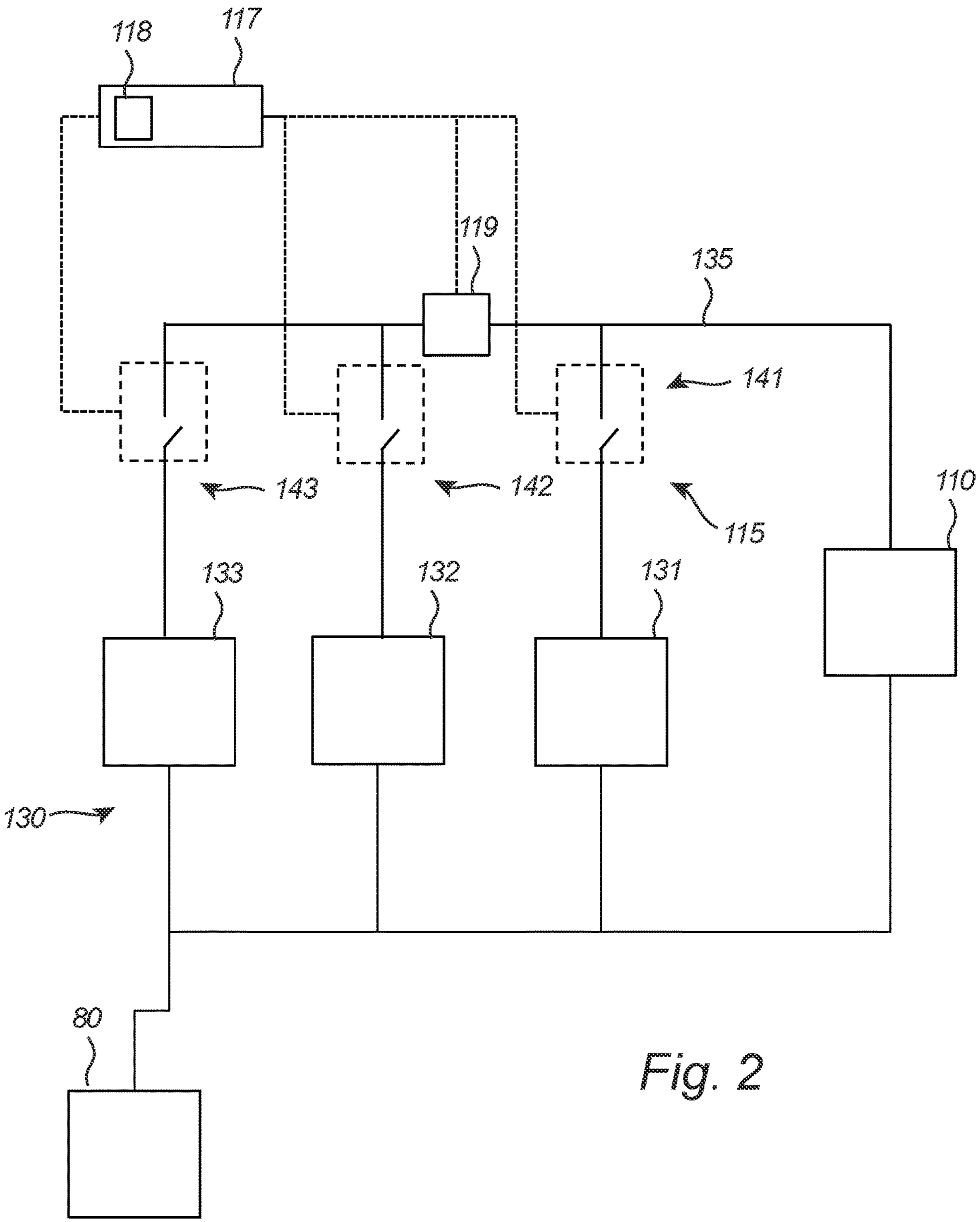
FIG. 2 is a schematic view of a switching arrangement and a rechargeable energy storage system having a plurality of battery packs arranged in parallel for powering a load, in accordance with an example embodiment of the invention.

FIG. 2 is a schematic view of a switching arrangement 115 and a rechargeable energy storage system, RESS 130, the RESS 130 comprising a plurality of parallelly arranged battery packs 131, 132, 133 for powering at least one load 110 via a traction voltage bus 135. The switching arrangement 115 is configured to connect and disconnect the battery packs 131, 132, 133 relative to the traction voltage bus 135. Moreover, the battery packs 131, 132, 133 may be charged via an external electrical energy source 80, such as the electrical grid. The embodiment shown in FIG. 2 may be implemented in the vehicle 1 of FIG. 1, and thus the switching arrangement 115, the RESS 130 and the load 110 of FIG. 2, may correspond to the switching arrangement 15, the RESS 30 and the electric machine 10 of FIG. 1. Thus, the load 110 in FIG. 2 may be an electric machine.

The RESS 130 comprises a first battery pack 131, a second battery pack 132 and a third battery pack 133 arranged in a parallel configuration, but it should be noted that any number of battery packs may be included in the RESS 130. The switching arrangement 115 comprises a first contactor 141 configured to connect and disconnect the first battery pack 131 relative to the traction voltage bus 135 by closing and opening, respectively, and comprises a second contactor 142 configured to connect and disconnect the second battery pack 132 relative to the traction voltage bus 135 by closing and opening, respectively, and comprising a third contactor 143 configured to connect and disconnect the third battery pack 133 relative to the traction voltage bus 115 by closing and opening, respectively. Thus, the switching arrangement 115 comprises an associated contactor, here being the first, second and third contactors 141, 142, 143, for each battery pack, here being the corresponding first, second and third battery packs 131, 132, 133. Stated differently, the first, second and third contactors 141, 142, 143 are configured to connect and disconnect the first, second and third battery packs 131, 132, 133 relative to the traction voltage bus 135 by closing and opening, respectively. As shown in FIG. 2, the first, the second and third battery packs 131,132, 133 are connected to the load 110 via the common traction voltage bus 135 arranged between the first, second and third contactors 141, 142, 143 and the load 110. The load 110 may be powered by the first, second and third battery packs 131, 132, 133 by closing the first, second and third contactors 141, 142, 143, respectively (i.e. by connecting the first, second and third battery packs 131, 132, 133 to the load 110) and the first, second and third battery packs 131, 132, 133 may be disconnected from the load 110 by opening the first, second and third contactors 141, 142, 143. Alternatively, an additional contactor may be provided between the traction voltage bus 135 and the load 110. Moreover, it should be noted that the embodiment of FIG. 2 is schematical, and that other additional contactors and electrical components known to the skilled person may be comprised in the RESS 130 or switching arrangement 115 of FIG. 2. For example, there may be a charging interface arranged between the external electrical energy source 80 and the RESS 130.

The switching arrangement 115 comprises a control unit 117 configured to control the operation of the switching arrangement 115. The switching arrangement 115 is, via the control unit 117, configured to recognize a window of opportunity in which no request for powering the load 110 by the first, second and third battery packs 131, 132, 133, and no request for charging the first, second and third battery packs 131, 131, 133, is present or allowed to be implemented. Thus, the window of opportunity is referring to vehicle state or a point in time (or a time slot or a time range) in which no request for powering the load 110 by the first, second and third battery packs 131, 132, 133, and no request for charging the first, second and third battery packs 131, 131, 133, is present or allowed to be implemented. In other words, in the window of opportunity, the first, second and third battery packs 131, 132, 133 are not powering the load 110, and are not being charged by the external electrical energy source 80.

The switching arrangement 115 is configured to, in the window of opportunity, prevent the first, second and third contactors 141, 142, 143 to open, and thereby enabling equalization due to current transfer between the first, second and third battery packs 131, 132, 133 (which is further described with reference to FIGS. 3A-3B). The current transfer between the first, second and third battery packs 131, 132, 133 is achieved by current transfer via the traction voltage bus 135. Typically, such prevention of the opening the first, second and third contactors 141, 142, 143 is controlled by the control unit 117.

The switching arrangement 115 is configured to measure the current transfer between the first, second and third battery packs 131, 132, 133, and in response to the measured current transfer, prevent the first, second and third contactors 141, 142, 143 to open and/or opening the first, second and third contactors 141, 142, 143. That is, depending on the outcome of the measured current transfer, the switching arrangement 115 is either configured to open the first, second and third contactors 141, 142, 143, or is configured to prevent opening of the first, second and third contactors 141, 142, 143. Typically, such measurement of the current transfer between the first, second and third battery packs 131, 132, 133 is controlled by the control unit 117. For example, and as shown in FIG. 2, the control unit 117 may be configured to detect and measure the current transfer at the common traction bus 135 by means of a sensor 119.

The control unit 117 may be configured to measure the current transfer between the first, second and third battery packs 131, 132, 133 by a preceding measurement of the current transfer prior to preventing the first, second and third contactors 141, 142, 143 to open. The control unit 117 may further be configured to determine whether or not the current transfer in the preceding measurement achieves an initiating threshold, and in response of determining that the current transfer achieves the initiating threshold, preventing the first, second and third contactors 141, 142, 143 to open. Typically, the initiating threshold is an initiating current threshold of e.g. 4 A, and the control unit 117 is configured to determine whether the current transfer in the preceding measurement exceeds the initiating current threshold. That is, if the current transfer between the first, second and third battery packs 131, 132, 133 is high enough (i.e. above the initiating current threshold), there is apparently a need for equalization between the first, second and third battery packs 131, 132, 133, and the control unit 117 may thus prevent the first, second and third contactors 141, 142, 143 to open, in order to allow the equalization between the battery packs 131, 132, 133 to occur.

The control unit 117 may be configured to measure the current transfer between the first, second and thirds battery packs 131, 132, 133 by a subsequent measurement of the current transfer after preventing the first, second and third contactors 141, 142, 143 to open. The control unit 117 may further be configured to determine whether or not the current transfer in the subsequent measurement achieves a terminating threshold, and in response of determining that the current transfer achieves the terminating threshold, opening the first, second and third contactors 141, 142, 143. Typically, the terminating threshold is a terminating current threshold of e.g. 1.5 A, and the control unit 117 is configured to determine whether the current transfer in the preceding measurement is below the terminating current threshold. That is, if the current transfer between the first, second and third battery packs 131, 132, 133 is low enough, i.e. below the terminating threshold, there is no need for (further) equalization between the first, second and third battery packs 131, 132, 133, and the control unit 117 may thus open the first, second and third contactors 141, 142, 143.

Stated differently, in a first state of the RESS 130, being a fully connected state, each one of the first, second and third contactors 141, 142, 143 are closed and each one of the first, second and third battery packs 131, 132, 133 are connected to the traction voltage bus 135 and to the load 110, and are thus powering the load 110. In a second state of the RESS 130, being a state providing a window of opportunity, each one of the first, second and third contactors 141, 142, 143 are closed, but the first, second and third battery packs 131, 132, 133 are not powering the load 110 (and are not being charged by the external electrical energy source 80). Thus, in the second state, current is transferred between the first, second and third battery packs 131, 132, 133, via the traction voltage bus 135, to achieve equalization between the first, second and third battery packs 131, 132, 133. Hereby, the voltage level, typically the open circuit voltage, OCV, of the different battery packs 131, 132, 133 may be equalized, or at least become more equal to each other compared to before the equalization. Depending on the outcome of the measured current transfer during the equalization, the contactors may be opened in a third state of the RESS 130, in which no current transfer is allowed between the first, second and third battery packs 131, 132, 133. Alternatively, a request for powering the load 110, or a request for charging the first, second and third battery packs 131, 132, 133, interrupts the equalization and the second state by e.g. returning to the first state. In other words, the window of opportunity may be shut upon a request for powering the load 110 by the first, second and third battery packs 131, 132, 133, or upon a request for charging the first, second and third battery packs 131, 132, 133 by the external electrical energy source 80. According to at least one example embodiment, the switching arrangement 115 is configured to detect and/or keep track of the window of opportunities. For example, and as seen in FIG. 2, the control unit 117 may further comprise a detecting functionality 118. Such detecting functionality 118 is configured to monitor any power request from the load 110, and/or any request for charging the battery packs 131, 132, 133 by means of the external electrical energy source 80.

The switching arrangement 115 may further be configured to close the first, second and third battery packs 131, 132, 133 by means of the first, second and third contactors 141, 142, 143, respectively, for renewed electrical connection to the traction voltage bus 135 and for powering the load 110. Thus, between subsequent disconnections of the battery packs 131, 132, 133, the battery packs 131, 132, 133 may be electrically connected to the traction voltage bus 135 for powering the load 110. The switching arrangement 115 may, via the control unit 117, be further configured to alternately connect and disconnect the first, second and third battery packs 131, 132, 133, to the traction voltage bus 135, wherein, the equalization (i.e. during the step of preventing the first, second and third contactors 141, 142, 143 to open) is carried out prior to each step of disconnecting the first, second and third battery packs 131, 132, 133.

It should be noted that not all of the first, second and third battery packs 131, 132, 133 need to be included in the equalization operation in which their associated contactor 141, 142, 143 is prevented from opening. Instead, only two of the first, second and third battery packs 131, 132, 133 need to be included in the equalization operation, while the other one of the first, second and third battery packs 131, 132, 133 is disconnected, or alternatively is being charged by the external electrical energy source 80, or is powering the load 110. For example, the third battery pack 133 may be disconnected from the traction voltage bus 135 by opening the corresponding third contactor 143, while the first and second contactors 141, 142 for the other two battery packs 131, 132 are prevented from opening to achieve equalization between the first and second battery packs 131, 132. The third battery pack 133 may e.g. have an OCV very different from the other ones, e.g. due to that the battery pack is worn out, or damaged, or that it is a completely new battery pack.

It should be mentioned that the first battery pack 131 may be connected in series with a first pre-contactor arranged on the opposite side of the first battery pack 131 as compared to the first contactor 141. Correspondingly, the second battery pack 132 may be connected in series with a second pre-contactor arranged on the opposite side of the second battery pack 132 as compared to the second contactor 142, and the third battery pack 133 may be connected in series with a third pre-contactor arranged on the opposite side of the third battery pack 133 as compared to the third contactor 143.

Figure 3A:
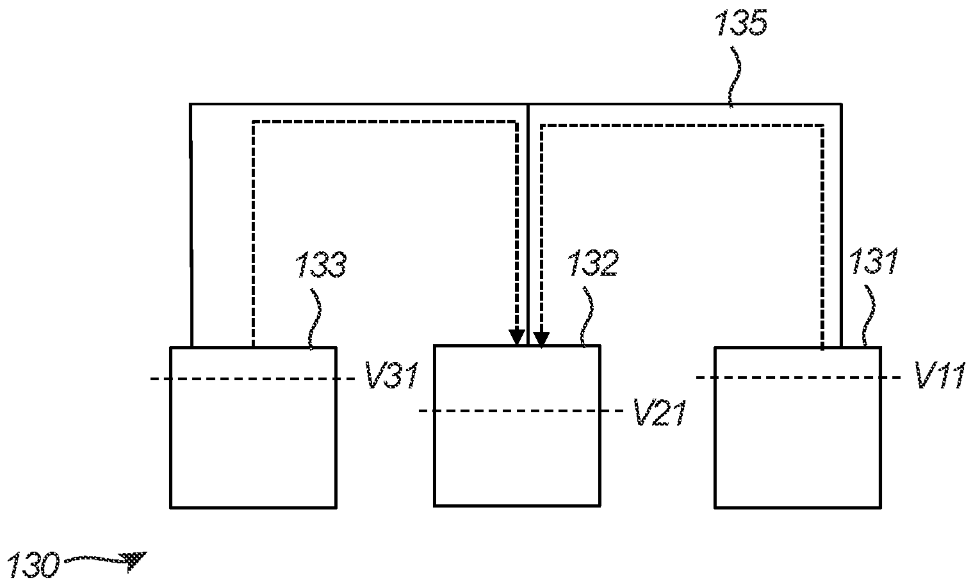
FIGS. 3A-3B are schematic views illustrating equalization between battery packs of a rechargeable energy storage system, in accordance with example embodiments of the invention.
Figure 3B:
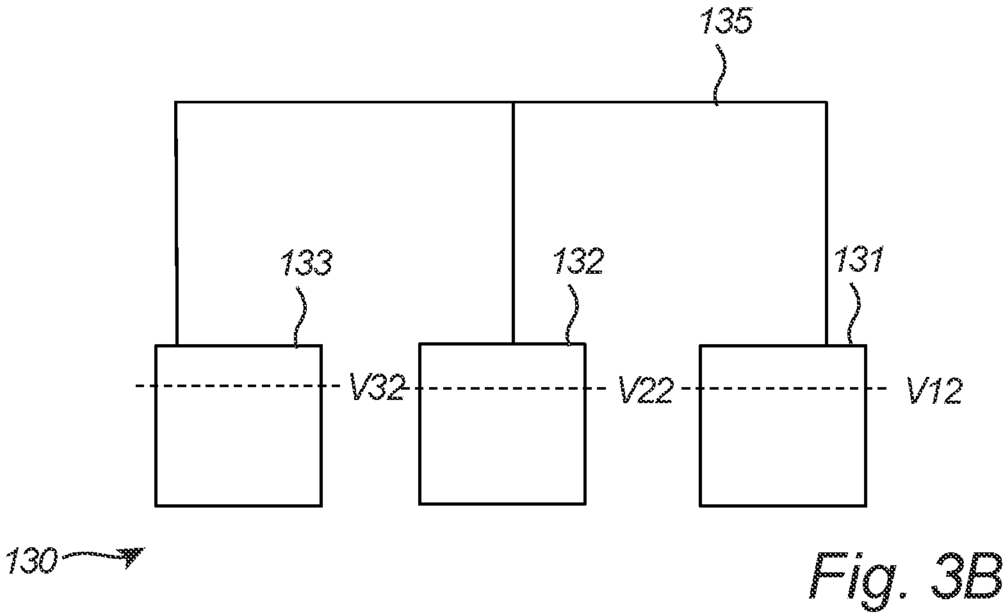

Turning to FIGS. 3A-3B showing a schematical example of the equalization between the first, second and third battery packs 131, 132, 133 of FIG. 2. Thus, the equalization is achieved by current transfer between the first, second and third battery packs 131, 132, 133, via the traction voltage bus 135, as the associated first, second and third contactors 141, 142, 143 are prevented from opening (the first, second and third contactors 141, 142, 143 are not shown in FIGS. 3A-3B for increased comprehensibility).

In FIG. 3A, prior to the equalization, e.g. at the beginning of the window of opportunity and subsequent to the preceding measurement of the current transfer in which it has been determined that the current transfer of the preceding measurement achieves the initiating threshold (e.g. exceeds the initiating threshold), the voltage levels of the first, second and third battery packs 131, 132, 133 differ from each other. The voltage level here is typically the open circuit voltage, OCV. Thus, at this first point in time, the voltage level of the first battery pack 131 is V11, the voltage level of the second battery pack 132 is V21, and the voltage level of the third battery pack 133 is V31. It is clear that the voltage level V21 of the second battery pack 132 is lower compared to the voltage levels V11, V31 of the other two battery packs 131, 133. Thus current will flow, via the traction voltage bus 135, from the first and second battery packs 131, 133 to the second battery pack 132, as indicated by the dashed arrows.

In FIG. 3B, during or after the equalization, the voltage levels of the first, second and third battery packs 131, 132, 133 have been equalized, or substantially equalized. That is, at this second point in time, the voltage level of the first battery pack 131 has been lowered compared to in FIG. 3A to the voltage level V12, the voltage level of the second battery pack 132 has been increased compared to in FIG. 3A to the voltage level V22 (i.e. owing to the current transfer from the first and third battery packs 131, 132), and the voltage level of the third battery pack 133 has been lowered compared to in FIG. 3A to the voltage level V32. Thus current has flown, via the traction voltage bus 135, from the first and second battery packs 131, 133 to the second battery pack 132. At this second point in time, the subsequent measurement of the current transfer may be performed, and it may be determined that the current transfer in the subsequent measurement achieves the terminating threshold (e.g. that the current transfer is below the terminating threshold), and in response of such determination perform opening the first, second and third contactors 141, 142, 143 to terminate the equalization.

Thus, FIGS. 3A-3B show different points in time, typically comprised in the window of opportunity, wherein the first, second and third battery packs 131, 132, 133 are equalized with regards to the open circuit voltage, OCV. The equalization of the voltage levels shown in FIG. 3B typically results in a reduced electrical wear upon reconnection of the contactors 141, 142, 143 to power the load 110. That is, electric wear of the contactors 141, 142, 143 is reduced.

Figure 4:
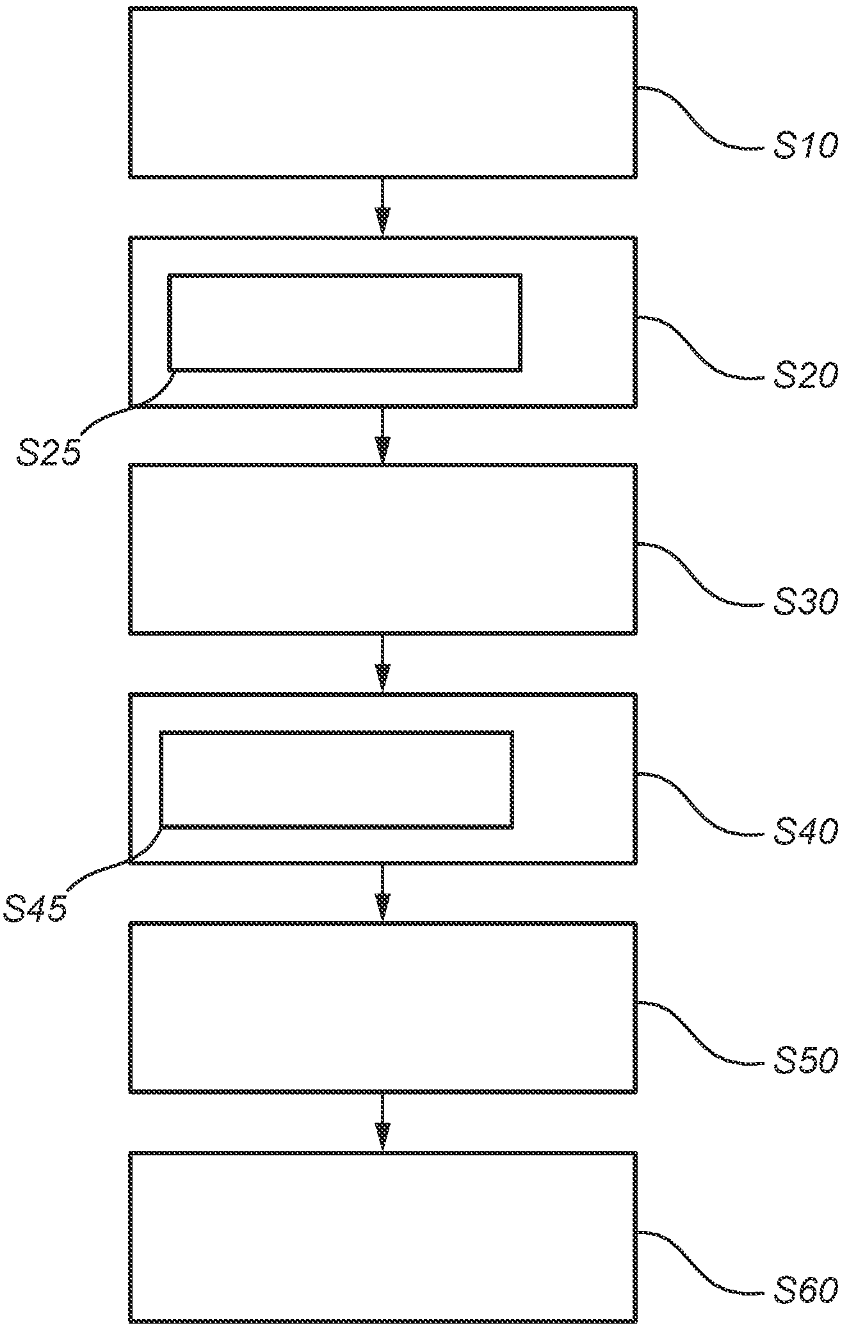
FIG. 4 is a flowchart illustrating the steps of a method in accordance with example embodiments of the invention.

The operation of a switching arrangement, as the switching arrangement 115, will now be described in more general terms with additional reference to FIG. 4. FIG. 4 is a flowchart describing the steps of a method for operating a switching arrangement of a rechargeable energy storage system, RESS, the RESS comprising a plurality of parallelly arranged battery packs, e.g. the first, second and third battery packs 131, 132, 133 of FIG. 2, and the switching arrangement comprising an associated contactor for each battery pack, as the first, second and third contactors 141, 142, 143 of FIG. 2. The contactors are configured to connect and disconnect the battery packs relative a traction voltage bus by closing and opening, respectively, the traction voltage bus being connected to at least one load.

In a step S10, being e.g. a first step S10, a window of opportunity in which no request for powering the load by the battery packs, and no request for charging the battery packs, is present or is allowed to be implemented, is provided. This may e.g. be achieved by the control unit 117, and the detecting functionality 118, as described with reference to FIG. 2.

In a step S20, being e.g. a second step S20, the current transfer between the battery packs is measured.

In a step S30, being e.g. a third step S30, in the window of opportunity, the contactors are prevented to open and thereby enabling equalization due to current transfer between the battery packs. In the step of preventing the contactors to open S30, current transfer is accomplished between the battery packs by means of the traction voltage bus, as described with reference to FIG. 2 and FIGS. 3A-3B. Typically, the battery packs are equalized with regards to the open circuit voltage, OCV.

The step of preventing the contactors to open S30 may be carried out in response to the step S20 of measuring the current transfer between the battery packs. This measurement of the current transfer S20 may be referred to as a preceding measuring of the current transfer S20, which is carried out prior to the step of preventing the contactors to open S30. For example, the preceding measuring of the current transfer S20 may comprises the step S25 of determining whether or not the current transfer in the preceding measurement S20 achieves an initiating threshold. Thus, the step of preventing the contactors to open S30 may be carried out in response of determining that the current transfer achieves the initiating threshold. Typically, the current transfer of the preceding measuring of the current transfer S20 should exceed the initiating threshold.

In a step S40, being e.g. a fourth step S40, the current transfer between the battery packs is measured. This measurement of the current transfer S40 may be referred to a subsequent measuring of the current transfer S40 which is carried out after the step of preventing the contactors to open S30. For example, the subsequent measuring of the current transfer S40 may comprise the step S45 of determining whether or not the current transfer in the subsequent measurement S40 achieves a terminating threshold.

In a step S50, being e.g. a fifth step S50, in response to the measured current transfer S40, the contactors are opened. Typically the step of opening the contactors S50 is carried out in response of determining that the current transfer achieves the terminating threshold. Typically, the current transfer of the subsequent measuring of the current transfer S40 should be below the terminating threshold.

In a step S60, being a step carried out any time after the step of providing a window of opportunity S10, the window of opportunity is shut upon a request for powering the load by the battery packs, or upon a request for charging the battery packs. Thus, any equalization performed in response to preventing the contactors to open S30 will be interrupted or terminated. Typically, the request for powering the load or the request for charging, is a permitted request from an approved source.

According to at least one example embodiment, the plurality of battery packs comprises at least three battery packs, wherein the step of preventing the contactors to open S30 to thereby enable equalization of the battery packs is carried out for at least two of the battery packs of the plurality of battery packs.

It should be noted that the naming of the steps not necessarily, but might according to at least one example embodiment, relate to the order in which the steps are carried out, unless explicitly stated otherwise. For example, only the preceding measuring of the current transfer S20, or only the subsequent measuring of the current transfer S40, may be included in the method. Moreover, one or more of the steps may be combined and carried out simultaneously. The switching arrangement of FIG. 2 may be configured to carry out one or several of the steps S10-S60, typically by means of the control unit.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method performed by a control unit for operating a switching arrangement of a rechargeable energy storage system, RESS, the RESS comprising a plurality of parallelly arranged battery packs and the switching arrangement comprising an associated contactor for each battery pack, the contactors being configured to connect and disconnect the battery packs relative a traction voltage bus by closing and opening, respectively, the traction voltage bus being connected to at least one load, the method comprising:

providing a time range in which no request for powering the load by the battery packs, and no request for charging the battery packs, are allowed to be implemented, in the time range, preventing the contactors to open enabling equalization due to current transfer between the battery packs, measuring the current transfer between the battery packs, and in response to the measured current transfer, preventing the contactors to open and/or opening the contactors.

2. The method according to claim 1, wherein measuring the current transfer between the battery packs comprises a preceding measuring of the current transfer prior to preventing the contactors to open, and wherein the method further comprises:

determining whether or not the current transfer in the preceding measurement achieves an initiating threshold, and in response of determining that the current transfer achieves the initiating threshold, preventing the contactors to open.

3. The method according to claim 1, wherein measuring the current transfer between the battery packs comprises a subsequent measuring of the current transfer after preventing the contactors to open, and wherein the method further comprises:

determining whether or not the current transfer in the subsequent measurement achieves a terminating threshold, and in response of determining that the current transfer achieves the terminating threshold, opening the contactors.

4. The method according to claim 1, wherein during preventing the contactors to open, the current transfer between the battery packs is accomplished by the traction voltage bus.

5. The method according to claim 1, wherein the battery packs are equalized with regards to an open circuit voltage, OCV.

6. The method according to claim 1, wherein the time range is shut upon a request for powering the load by the battery packs, or upon a request for charging the battery packs.

7. The method according to claim 6, wherein the request for powering the load or the request for charging is a permitted request from an approved source.

8. The method according to claim 1, wherein the plurality of battery packs comprises at least three battery packs, and wherein the preventing the contactors to open enabling equalization of the battery packs is carried out for at least two of the battery packs of the plurality of battery packs.

9. A switching arrangement for a rechargeable energy storage system, RESS, the RESS comprising a plurality of parallelly arranged battery packs, the switching arrangement controlled by a control unit comprising:

an associated contactor for each battery pack, the contactors being configured to connect and disconnect the battery packs relative a traction voltage bus by closing and opening, respectively, the traction voltage bus being connected to at least one load, the switching arrangement being configured to:

recognize a time range in which no request for powering the load by the battery packs, and no request for charging the battery packs, is allowed to be implemented, in the time range, prevent the contactors to open enabling equalization due to current transfer between the battery packs, measure the current transfer between the battery packs, and in response to the measured current transfer, prevent the contactors to open and/or opening the contactors.

10. A rechargeable energy storage system, RESS, of a vehicle, the RESS comprising a plurality of parallelly arranged battery packs for powering at least one load, and a switching arrangement according to claim 9.

11. A vehicle comprising a rechargeable energy storage system, RESS, according to claim 10.

12. A controlling apparatus for operating a switching arrangement of a rechargeable energy storage system, RESS, the RESS comprising a plurality of parallelly arranged battery packs and the switching arrangement comprising an associated contactor for each battery pack, the contactors being configured to connect and disconnect the battery packs relative a traction voltage bus by closing and opening, respectively, the traction voltage bus being connected to at least one load, the controlling apparatus being configured to:

provide a time range in which no request for powering the load by the battery packs, and no request for charging the battery packs, are allowed to be implemented, in the time range, prevent the contactors to open enabling equalization due to current transfer between the battery packs, measure the current transfer between the battery packs, and in response to the measured current transfer, preventing the contactors to open and/or opening the contactors.

13. A non-transitory computer program comprising program code for performing the method according to claim 1, when the program code is run on a computer.

14. A computer readable medium carrying a non-transitory computer program comprising program code for performing the steps according to claim 1, when the program code is run on a computer.

* * * * *